March 4, 1924.
R. RÜDENBERG
SYSTEM OF CONTROL
Filed Dec. 15, 1920
1,485,431
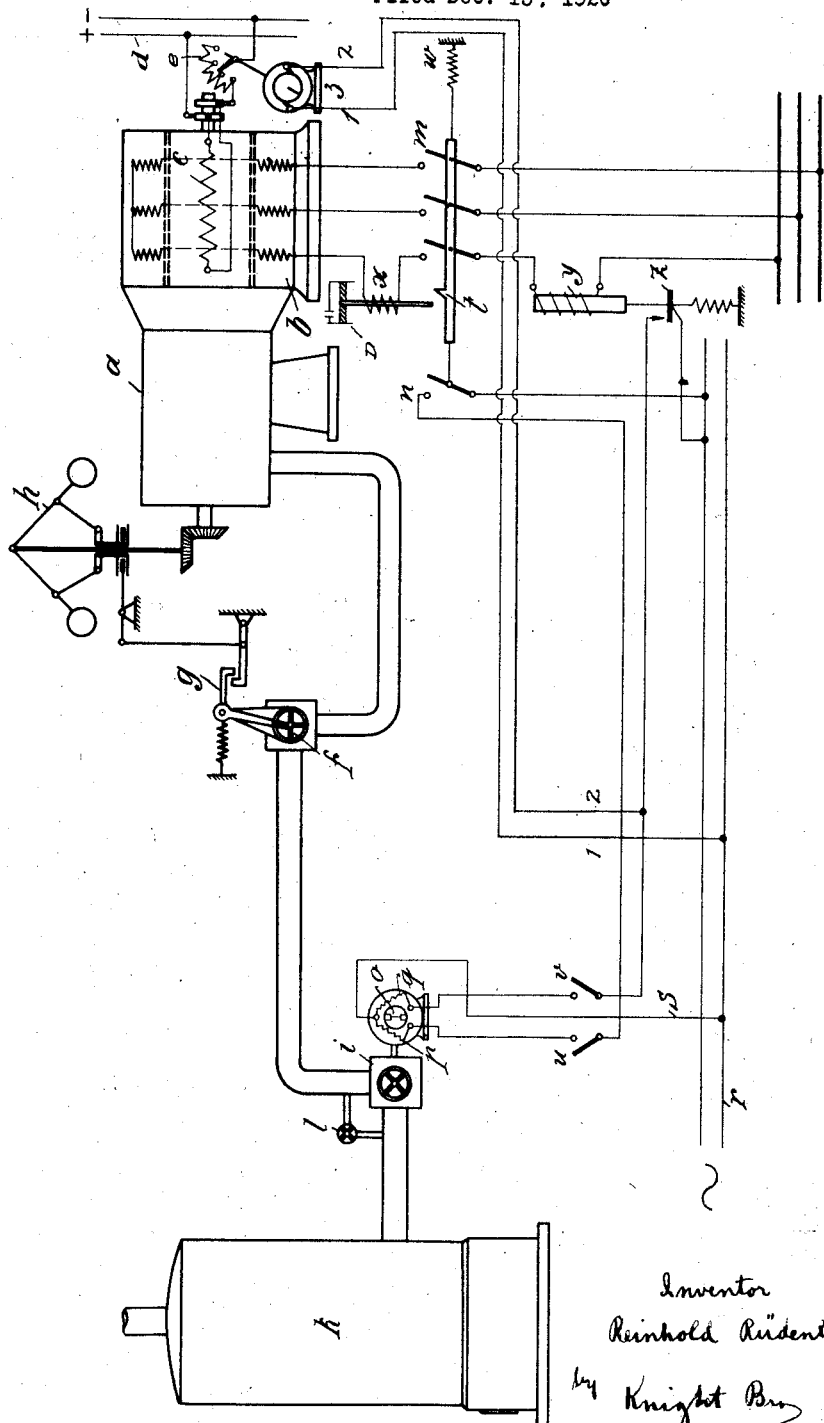
Inventor
Reinhold Rüdenberg
by Knight Bro
Attorneys Patented Mar. 4, 1924.

1,485,431

UNITED STATES PATENT OFFICE.

REINHOLD RÜDENBERG, OF BERLIN-GRUNEWALD, GERMANY, ASSIGNOR TO SIEMENS-SCHUCKTERTWERKE GESELLSCHAFT MIT BESCHRANKTER HAFTUNG, OF SIEMENS-STADT, NEAR BERLIN, GERMANY, A GERMAN CORPORATION.

SYSTEM OF CONTROL.

Application filed December 15, 1920. Serial No. 431,051.

*To all whom it may concern:*

Be it known that I, REINHOLD RÜDENBERG, a citizen of the German Empire, residing at Berlin-Grunewald, Germany, have invented certain new and useful Improvements in Systems of Control, of which the following is a specification.

My invention relates to protective arrangements for dynamo-electric machines, and particularly to arrangements for protecting such machines from operating at too high speeds.

In the operation of electric generators of great output special precautionary measures are required for protecting the machines against any undue increase of speed such as may take place whenever at excessive loads in the system the overload circuit breaker is actuated and cuts out the electric energy. Since the supply of motive power such as steam, liquid fuel, the electric current and the like to the driving motor or prime mover is at first decreasing only slowly, it will cause the speed of the generator to rise. In order to avoid any undue increase of speed, a rapid closing valve adapted to be actuated by the governor of the prime mover has been proposed to be inserted in the supply of motive power to the prime mover.

Experience has shown that such rapid closing valves are apt to undergo detrimental changes under the influence of the high temperature of the steam. They are liable to warp and, in consequence thereof, to stick fast or to effect only an imperfect closure, thus leaving the supply of energy to the prime mover partly uninterrupted. The prime mover as well as the generator are subject thereby to great damage.

According to my invention I avoid this drawback by providing a safety arrangement doing away with the causes for racing of the machine and thereby rendering the machine in most cases independent from the state and conditions of working of the rapid closing valve. I propose to take care of interrupting the supply of energy to the generator before the generator main switch is opened. I prefer interrupting the supply of motive power to the prime mover immediately before opening the main switch, thus causing the energy to be decreased already when the generator main switch is opened, and thereby avoiding everything which might form a cause for the racing of the machines. In some causes I further prefer decreasing at the same time the exciter energy of the generator.

In carrying my invention into practice I may proceed in different ways, but in all cases I obtain the advantage of absolutely protecting the prime mover as well as the generator from the mechanical risks of racing. This is the more important as in modern machines of this kind inasmuch as the stress placed upon them is already so high that the admissible maximum increase of velocity of about 15 per cent constitutes the admissible maximum stress placed on the different parts of the machine.

I further obtain the very important advantage of being now able to disconnect the electric generator in an absolutely unenergized state, thus avoiding all the difficulties, which have to be dealt with generally in high power switches. The turbine or other prime mover is prevented from supplying any more energy to the switch arc; on the other hand a racing of the turbine after the main switch is opened is rendered impossible from the beginning, and therefore the switch as well as the winding on the machine are absolutely protected from a mechanical as well as from an electrical point of view.

In order to cut off the supply of energy before opening the generator main switch I prefer employing the releasing mechanism of the generator main switch itself, which is actuated either by the maximum current or reversal of current or by the drop in voltage or some other safety device for excess voltage protection or the like, the valve of the motive power supply being coupled with the said releasing mechanism either mechanically or electrically in such a manner that the valve movement leads the switch movement proper. In consequence thereof when the main switch is closed no matter from what causes the motive power supply is started, while before the main switch is opened the motive power supply is interrupted by causing the relay acting upon the main switch or a special relay to act previously upon the motive power supply. The main switch as well as the rapid closing device required as a safeguard against an undue increase in speed may be made to act through their releasing mechanisms upon the same stop valve for the same motive material supply. However, besides the rapid closing valve a special valve may be provided for regulating the motive power supply.

In the drawings accompanying this specification and forming part thereof the preferred form of an arrangement in accordance with my invention is shown in a purely diagrammatic manner.

$a$ is a steam turbine and $b$ is the electric generator driven by it. $c$ is the field winding of the generator fed from the continuous current mains $d$ over a regulator $e$. $f$ is the rapid closing valve actuated from the governor $h$ by means of the ratchet gear $g$. $i$ is a valve for controlling the steam supply from a boiler $k$ to the turbine $a$.

In order to start the generating set an auxiliary valve $l$ arranged near valve $i$ and also the rapid closing valve are opened, admitting steam into the turbine in a quantity sufficient to preheat it and to start it at full speed. As soon as this is effected the generator is synchronized and the main switch $m$ is closed. With the main switch is coupled a switch $n$ adapted to close a circuit for controlling the energy supply. Valve $i$ may be actuated for instance by a repulsion motor $o$. Its exciter winding $p$ is then closed and supplied from the circuit $r$ over switch $n$ and wire $s$ so that the motor moves in a valve opening direction, switch $u$ being assumed closed at that time.

Valve $i$ is now opened and full steam is supplied to the turbine. As soon as the valve is opened completely the end switch $u$ is opened by suitable means not shown here, so that the motor $o$ stops operating. The auxiliary valve $l$ may now be closed either by hand or by other suitable means.

In case an unduly large current is now generated, it will flow through the maximum releasing mechanism $x$ of the main switch as well as through another relay $y$, requiring less time to act than main switch $x$, which latter is controlled by suitable retarding means, for instance dash pot D. Relay $y$ when energized lifts the contact plate $z$ which is permanently connected to circuit $r$ and closes the circuit of auxiliary motor $o$ by means of the exciter winding $q$ such that this motor now runs in valve closing direction. The closing operation is continued until the end switch $v$ is opened by suitable means not shown here. At the same time also circuit 1, 2 is supplied with current from the system and starts a motor 3 coupled by a suitable clutch connection not shown with the regulator $e$ of the generator field $c$ in such a manner, that the motor will act upon the regulating resistance only in the case where it is desired to decrease the exciter energy for the cutting out of the generator. The motor therefore connects the regulating resistance in series and thus diminishes or renders ineffective the generator field. At the same time the maximum releasing mechanism $x$ releases the stop $t$ and the main switch as well as the circuit of auxiliary motor $o$ controlling the opening of the steam supply valve, to be opened. It is not necessary, of course, to operate the whole system by electrical means. If it is desired to throw the generator out in a normal way it is possible to close also the circuit for the closing movement of the steam supply valve so as to decrease the steam supply and the exciter energy of the generator before the main switch acts.

In the system described above the exciter energy is diminished by means of the motor 3 by placing an increasing resistance in series with the exciter winding. It is also possible to cause the releasing coil of the maximum switch $x$ to place a high resistance in the exciter circuit for instance by opening by means of the relay a short-circuiting device which shunts the said resistance during the normal working of the generator.

I claim:

1. The combination with an electric generator and a prime mover driving it, of a generator main switch, means connected in circuit with said switch for causing the interruption of the supply of energy to the prime mover before said switch is opened and means operatively connected with said switch for controlling the supply of motive power to the prime mover, when the main switch is closed.

2. The combination with an electric generator and a prime mover driving it, of a generator main switch and means in circuit with said switch for causing the interruption of the supply of motive power to the prime mover before releasing said switch.

3. The combination with an electric generator and a prime mover driving it, of a generator main switch, mechanism for releasing said switch and separate means for interrupting the motive power supply to the prime mover before said switch is released.

4. The combination with an electric generator and a prime mover driving it, of a generator main switch, a relay for releasing said switch and another relay suitably timed to act before said releasing relay for interrupting the supply of motive power to the prime mover.

5. The combination with an electric generator and a prime mover driving it, of a generator main switch, mechanism for releasing said switch, means for interrupting the supply of motive power to the prime mover before said main switch is released and means, controlled by the operation of said interrupting means for controlling the excitation of said generator.

6. The combination with an electric generator and a prime mover driving it, of a generator main switch, mechanism for releasing said switch within a predetermined time, means for interrupting in less time the supply of motive power to said prime mover and means, controlled by the operation of said interrupting means for cutting out the excitation of said generator.

In testimony whereof I affix my signature.

REINHOLD RÜDENBERG.